United States Patent
Denison et al.

(10) Patent No.: US 7,227,726 B1
(45) Date of Patent: Jun. 5, 2007

(54) METHOD AND SYSTEM FOR PROVIDING A DUAL-STRIPE MAGNETORESISTIVE ELEMENT HAVING PERIODIC STRUCTURE STABILIZATION

(75) Inventors: Edward Virgil Denison, Erie, CO (US); Herman C. Kluge, Erie, CO (US)

(73) Assignee: Storage Technology Corporation, Louisville, CO (US)

(*) Notice: Subject to any disclaimer, the term of this patent is extended or adjusted under 35 U.S.C. 154(b) by 61 days.

(21) Appl. No.: 10/292,044

(22) Filed: Nov. 12, 2002

(51) Int. Cl.
*G11B 5/39* (2006.01)

(52) U.S. Cl. .................................. 360/315; 360/320

(58) Field of Classification Search ................ 360/315, 360/320
See application file for complete search history.

(56) References Cited

U.S. PATENT DOCUMENTS

| | | | |
|---|---|---|---|
| 3,860,965 A * | 1/1975 | Voegeli | 360/315 |
| 3,945,038 A * | 3/1976 | Lazzari | 360/315 |
| 4,306,215 A * | 12/1981 | Jeffers | 360/315 |
| 4,321,640 A | 3/1982 | van Gestel | 360/113 |
| 4,356,523 A | 10/1982 | Yeh | 360/113 |
| 4,477,794 A | 10/1984 | Nomura et al. | 338/32 R |
| 4,663,683 A | 5/1987 | Youda et al. | 360/113 |
| 4,878,140 A | 10/1989 | Gill et al. | 360/113 |
| 4,896,235 A | 1/1990 | Takino et al. | 360/113 |
| 5,005,096 A | 4/1991 | Krounbi et al. | 360/113 |
| 5,018,037 A | 5/1991 | Krounbi et al. | 360/113 |
| 5,079,035 A | 1/1992 | Krounbi et al. | 427/130 |
| 5,193,038 A | 3/1993 | Smith | 360/113 |
| 5,296,987 A * | 3/1994 | Anthony et al. | 360/315 |
| 5,309,305 A | 5/1994 | Nepela et al. | 360/113 |
| 5,438,470 A | 8/1995 | Ravipati et al. | 360/113 |
| 5,491,600 A | 2/1996 | Chen et al. | 360/113 |
| 5,530,608 A | 6/1996 | Aboaf et al. | 360/113 |
| 5,634,260 A | 6/1997 | Nix et al. | 29/603.14 |
| 5,664,316 A | 9/1997 | Chen et al. | 29/603.08 |
| 5,684,658 A | 11/1997 | Shi et al. | 360/113 |
| 5,713,122 A | 2/1998 | Aboaf et al. | 29/603.08 |
| 5,745,978 A | 5/1998 | Aboaf et al. | 29/603.08 |
| 5,783,460 A | 7/1998 | Han et al. | 438/3 |
| 6,278,594 B1 | 8/2001 | Engel et al. | 360/325 |
| 6,278,595 B1 | 8/2001 | Xue et al. | 360/327.31 |
| 6,291,087 B1 | 9/2001 | Xiao et al. | 428/692 |

FOREIGN PATENT DOCUMENTS

JP 60013319 A * 1/1985
JP 60089809 A * 5/1985

* cited by examiner

*Primary Examiner*—Craig A. Renner
(74) *Attorney, Agent, or Firm*—Brooks Kushman P.C.

(57) ABSTRACT

A dual-stripe element magnetroresistive read head for reading information from a magnetic tape. The read head includes a first insulating layer, a first active magnetoresistive layer formed on the first insulating layer, a second insulating layer formed on the first active magnetoresistive layer, a second active magnetoresistive layer formed on the second insulating layer, and a third insulating layer formed on the second active magnetoresistive layer. The second active magnetoresistive layer is magnetostatically coupled to the first active magnetoresistive layer. A periodic structure is formed on a surface of the first insulator layer. As the remaining layers are formed on the first insulating layer, the periodic structure is replicated throughout the read head. Thus, the periodic structure formed on the first insulator layer stabilizes both the first and second active layers via magnetic domain pinning for both layers along the edges of the periodic structure.

8 Claims, 2 Drawing Sheets

METHOD AND SYSTEM FOR PROVIDING A DUAL-STRIPE MAGNETORESISTIVE ELEMENT HAVING PERIODIC STRUCTURE STABILIZATION

BACKGROUND OF THE INVENTION

1. Field of the Invention

The present invention relates to a method and system for stabilizing active layers in dual element magnetoresistive read heads with periodic structure stabilization.

2. Background of the Invention

Information is written onto a magnetic tape by magnetizing tape elements. These magnetized tape elements produce a magnetic field which can be detected and converted to an electrical signal by a read head. A common type of read head for carrying out this conversion is the magnetoresistive (MR) read head.

A simple MR head consists of a thin film of magnetoresistive material, such as Permalloy, between two insulating layers. When the MR layer is formed, a magnetic field is typically applied in a direction parallel to the plane of the thin layer. Thus, the MR layer exhibits a uniaxial anisotropy with an easy-axis of magnetization parallel to the direction of the applied field. If an external magnetic field, such as from a magnetic tape, is applied normal to the easy-axis, the magnetization direction of the MR layer will rotate away from the easy-axis and toward the direction of the applied magnetic field. This magnetization rotation causes a change in resistance in the MR layer. When no external field is applied, the resistance is greatest. The resistance decreases with increasing applied field. For practical geometries of the MR layer, resistance as a function of applied field traces a bell-shaped curve. The MR head is often biased with an applied current such that a zero magnitude applied field results in a resistance near an inflection point on the resistance curve. Thus, small changes about a zero magnitude applied external field result in nearly linear changes in resistance.

To accommodate increasing densities of data stored on magnetic tape, the geometries of read heads continue to shrink. One difficulty encountered is the increasing affect of Barkhausen noise. As the width of the MR layer is narrowed, the MR layer tends to split into magnetic domains, resulting in demagnetization. In the presence of an increasing externally applied field, the domain walls make sudden movements, causing jumps in the output signal. Two methods exist to reduce or eliminate Barkhausen noise. The first is to increase the effective length of the MR layer. Lengthening the MR reduces demagnetization at the ends and, hence, results in a greater retention of a single magnetic domain. The main difficulty with this technique is that the resulting increase in read head size is contrary to the need for increased data density on magnetic tapes. The second technique uses a small magnetic field in the direction of the easy-axis to induce a single domain in the MR layer. An implementation of this method uses permanent magnets placed over the ends of the MR layer. These magnets strongly pin the domains of the MR layer under the magnets and create a weak longitudinal magnetic field in the MR layer between the covered ends. Difficulties with this implementation include complex geometries and additional processing steps required to implement the additional permanent magnet. In addition to Barkhausen noise, cross-sensitivities to other parameters, such as temperature, can affect the performance of the MR head.

A dual active element MR read head minimizes cross-sensitivities. The dual active element MR head includes two MR layers in parallel separated by an insulating layer. Two additional insulating layers, one on each end of the structure, insulate the MR layers from surrounding materials. The two MR layers are connected in parallel to a source current such that current flows in the same direction through both layers. The fringe field produced by current flowing through each MR layer biases the adjacent layer. Hence, an externally applied magnetic field produces an increase in resistance of one MR layer and a corresponding decrease in resistance of the other MR layer. A differential amplifier with an input connected to each MR layer converts these changes in resistance to an output voltage. Environmental changes to both MR layers, such as changes in temperature, appear as common mode inputs to the differential amplifier and, hence, are rejected.

A typical dual stripe magnetoresistive (DSMR) read elements does not lend itself to most methods of stabilization due to the thin layer of alumina separating the elements. The abutted junctions formed when stabilizing the element with permanent magnet regions or other materials create an area along the junction of high element to element shorting potential, reduced yields, and reduced reliability.

SUMMARY OF THE INVENTION

A method and system are disclosed that provide a dual-stripe element magnetoresistive read head for reading information from a magnetic tape. The read head includes a first insulator layer, a first active magnetoresistive layer formed on the first insulator layer, a second insulator layer formed on the first active magnetoresistive layer, a second active magnetoresistive layer formed on the second insulator layer, and a third insulator layer formed on the second active magnetoresistive layer. The second active magnetoresistive layer is magnetostatically coupled to the first active magnetoresistive layer. A periodic structure is formed on a surface of the first insulator layer. As the remaining layers are formed on the first insulator layer, the periodic structure is replicated throughout the read head. Thus, the periodic structure formed on the first insulator layer stabilizes both the first and second active layers via magnetic domain pinning for both layers along the edges of the periodic structure.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a dual element magnetoresistive (MR) read head that includes periodic structure stabilization. The read head includes a first magnetic shield, a first insulator layer formed on the first magnetic shield, a first active MR layer formed on the first insulator layer, a second insulator layer formed on the first active MR layer, a second active MR layer formed on the second insulator layer, a third insulator layer formed on the second active MR layer, and a second magnetic shield formed on the third insulator layer. The second active MR layer is magnetostatically coupled to the first active MR layer.

A linear grating pattern is formed unidirectionally on a surface of the first insulator layer. Thereafter, as the remaining layers are deposited on the first insulator layer, the grating pattern is replicated through the remaining layers.

By patterning the periodic structure of lines and spaces etched into the first insulator layer, the first and second active MR layers are stabilized via magnetic domain pinning along the edges of the periodic structure. The periodic structure is preferably photo-lithographically patterned at a 45' angle in the direction of a bias current applied to the read head.

The active MR layers are deposited such that the easy axis of the active MR layers are opposing. Upon introduction of the bias current to the read head, the easy axis of each active MR layer rotates such that they are in opposing directions, and are parallel to the periodic structure.

Figure 1:
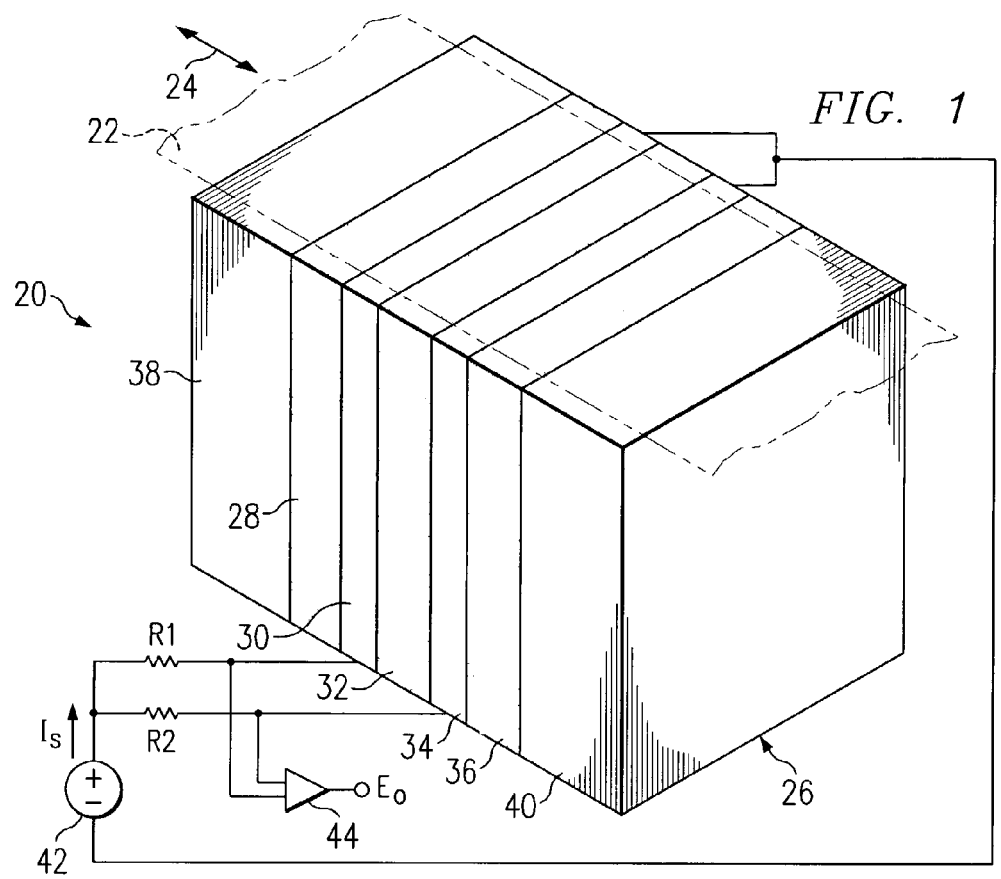
FIG. 1 is a schematic diagram of a dual active element magnetoresistive sensor having periodic structure stabilization in accordance with the present invention.

FIG. 1 is a schematic diagram of a dual active element magnetoresistive sensor having periodic structure stabilization in accordance with the present invention. A magnetoresistive (MR) read head, shown generally by 20, detects magnetic field patterns on tape 22 as tape 22 passes read head 20 in tape direction 24. Read head 20 includes a sensing element shown generally by 26. Sensing element 26 includes two active MR layers and three insulating layers. First insulator layer 28 insulates first active MR layer 30 from surrounding material. Second insulator layer 32 separates first active MR layer 30 and second active MR layer 34 and provides the magnetic gap spacing. Third insulator layer 36 insulates second active MR layer 34 from surrounding material.

A grating pattern is formed, as described further below, on a surface of first insulator layer 28. The grating pattern is a periodic structure of lines and spaces that stabilizes both first active MR layer 30 and second active MR layer 32.

In a preferred embodiment, first shield layer 38 is adjacent to first insulator layer 28 opposite from first MR layer 30. Also, second shield layer 40 is adjacent to third insulator layer 36 opposite from second MR layer 34. Shield layers 38, 40 shield MR layers 30, 34 from magnetic fields produced by magnetized regions of magnetic tape 22 not over MR layers 30, 34. In addition to providing insulation, insulator layers 28, 32, 36 provide magnetic gap spacing between the two MR layers 30, 34 and between each MR layer 30, 34 and the nearest shielding layer 38, 40.

Figure 2:
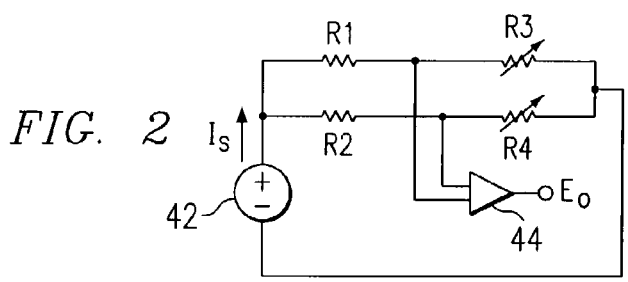
FIG. 2 is an equivalent circuit diagram for the dual active element magnetoresistive sensor of FIG. 1 in accordance with the present invention.

FIG. 2 is an equivalent circuit diagram for the dual active element magnetoresistive sensor of FIG. 1 in accordance with the present invention. The operation of MR read head 20 will be described. Independent voltage supply 42 provides a means for supplying current through first active MR layer 30 and second active MR layer 34. Other means for supplying current such as an independent current source, a dependent voltage source, or a dependent current source may be used as is known in the art. The supplied current, $I_s$, is split between two parallel paths. The first parallel path is through the series combination of resistor R1 and first active MR layer 30. The second path is through the series combination of resistor R2 and second active MR layer 34. Divided current $I_s$ flows through active MR layers 30, 34 in a direction generally parallel to the surface of tape 22 and perpendicular to tape direction 24.

Active MR layers 30, 34 change resistance in response to flux produced by magnetized fields on tape 22. First active MR layer 30 is represented by variable resistor R3 and second active MR layer 34 is represented by variable resistor R4 in FIG. 2. Differential amplifier 44, connected across the junction between resistors R1 and R3 and the junction between resistors R2 and R4, provides means for detecting the relative change in resistance between first active MR layer 30 and second active MR layer 34. The output of differential amplifier 44, $E_o$, indicates changes in magnetized fields on tape 22 as these changes move past first one and then the other of active MR layers, 30, 34.

Figure 3:
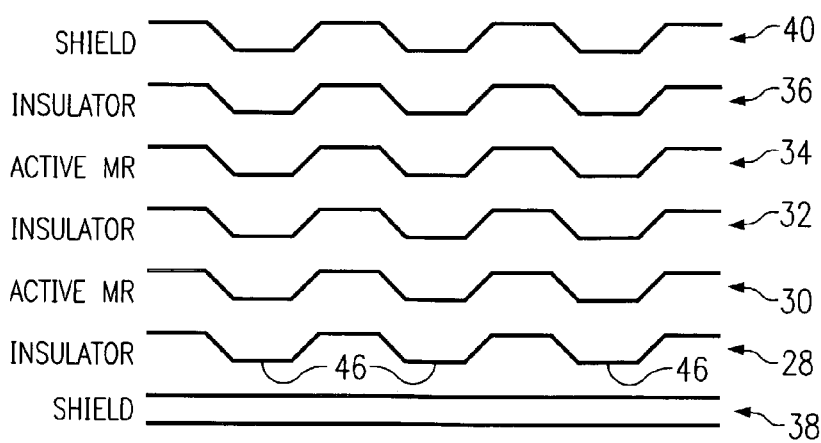
FIG. 3 illustrates a front, cross-sectional view of the dual active element magnetoresistive sensor of FIG. 1 in accordance with the present invention.

FIG. 3 illustrates a front, cross-sectional view of the dual active element magnetoresistive sensor of FIG. 1 in accordance with the present invention. First insulator 28 is first formed on a magnetic shield 38. The surface of first insulator 28 is then etched using photo-lithography to create a periodic structure of a series of parallel grooves 46 in the surface.

Figure 4:
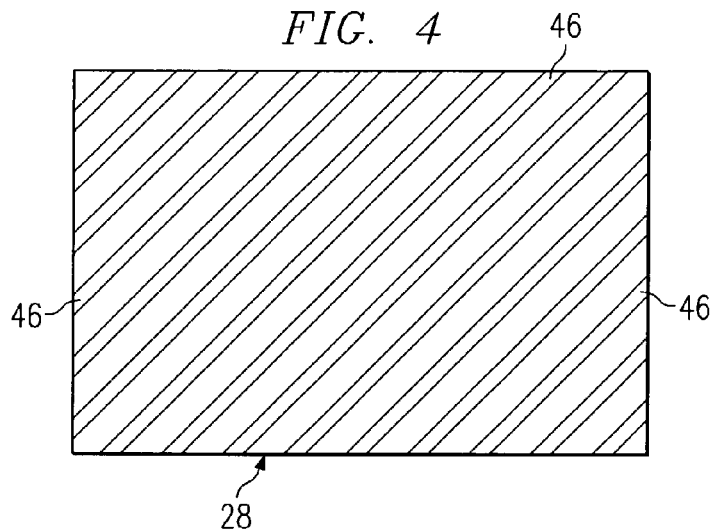
FIG. 4 illustrates a top view of an insulating layer included in the dual active element magnetoresistive sensor of FIG. 1 where the insulating layer has been etched to produce a plurality of gratings in accordance with the present invention.

The periodic grating pattern is formed on the surface of insulating layer 28. Grooves 46 are etched in the surface generally at a 45-degree angle in the direction of a bias current applied to read head 20 as depicted by FIG. 4. While a magnetic field is being applied along grooves 46 of the grating pattern, first active MR layer 30 is deposited on first insulating layer 28. The magnetic domains of both active MR layers 30 and 34 are aligned along the grating pattern and subdivided by the grating pattern. The grating pattern acts to trap domain walls mechanically between the grating edges and thereby reduce or eliminate Barkhausen noise arising from rapid and unpredictable domain wall shifts during changes in external magnetic field.

First active MR layer 30 is then formed on first insulator 28. Second insulator layer 32 is formed on first active MR layer 30. Second active MR layer 34 is formed on second insulator layer 32. Third insulator layer 36 is formed on second active layer 34. And, shield layer 40 is formed on third insulator layer 36. Although only first insulator 28 is etched to provide a grating pattern, the pattern is replicated through the remaining layers 30, 32, 34, 36, 38, and 40 because the layers conform to the pattern etched into layer 28 as these remaining layers are deposited.

Figure 5:
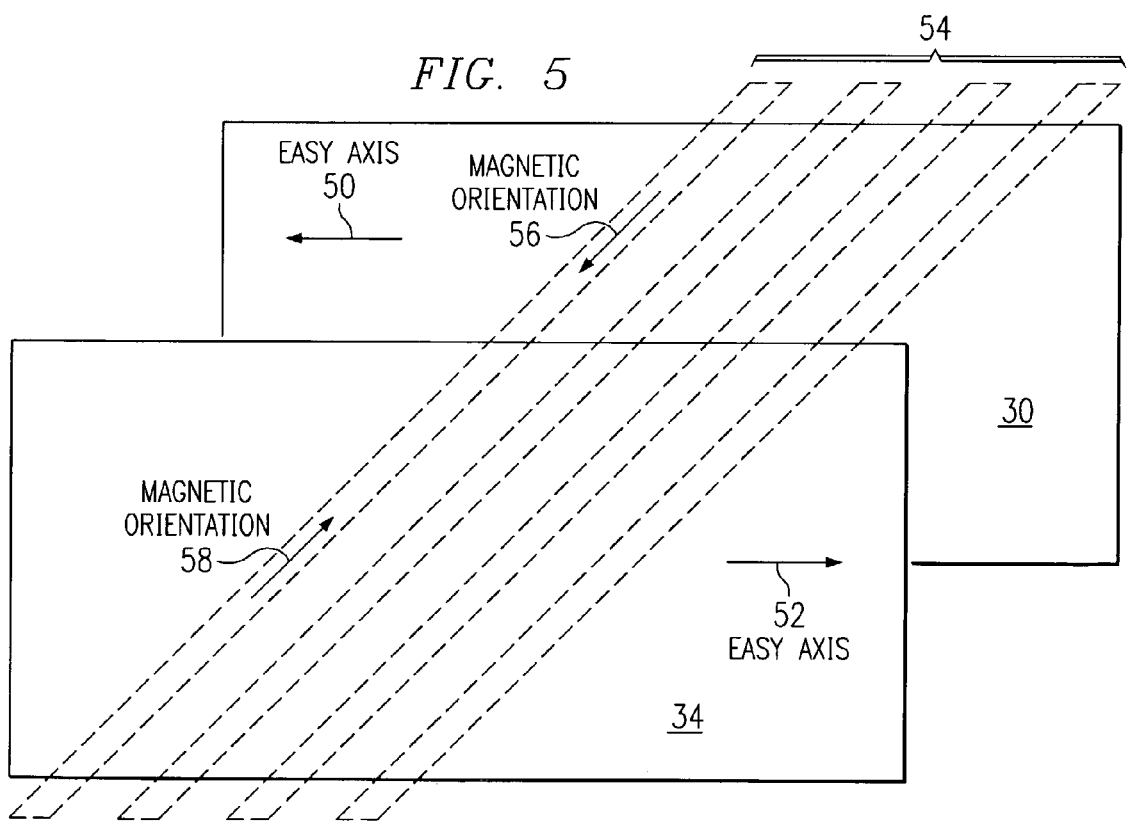
FIG. 5 depicts a magnetic orientation of biased elements of the dual active element magnetoresistive sensor where the sensor includes periodic structure stabilization in accordance with the present invention.

FIG. 5 depicts a magnetic orientation of biased elements of the dual active magnetoresistive sensor where the sensor includes periodic structure stabilization in accordance with the present invention. First active MR layer 30 has an easy axis in direction 50. Second active MR layer 34 has an easy axis in direction 52. Layers 30 and 34 are deposited such that directions 50 and 52 are opposing, as illustrated by FIG. 5.

A direction 54 of grooves 46 is depicted superimposed over layers 30 and 34. When a bias current is applied to read head 20, the magnetic orientation of each active MR layer rotates such that they remain opposing but are now parallel to the direction 54 of grooves 46. After the bias current is applied, the magnetic orientation axis of first active MR layer 30 rotates such that it becomes direction 56, and the magnetic orientation of second active MR layer 34 rotates such that it becomes direction 58. As illustrated by FIG. 5, the magnetic orientation of layers 30 and 34 remain opposing but are parallel to direction 54.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A dual element magnetoresistive read head for reading information from a magnetic tape, said read head comprising:
    a first insulator layer;
    a first magnetoresistive layer formed on said first insulator layer;
    a second insulator layer formed on said first magnetoresistive layer;
    a second magnetoresistive layer formed on said second insulator layer, said second magnetoresistive layer magnetostatically coupled to said first magnetoresistive layer;
    a third insulator layer formed on said second magnetoresistive layer;
    said first insulator layer including a linear grating pattern unidirectionally formed on a surface of said first insulator layer to form a periodic structure of a plurality of trenches such that the surface of said first insulator layer is a nonplanar insulator surface; and
    wherein said second magnetoresistive layer is stabilized utilizing magnetic domain pinning along edges of said grating pattern.

2. The read head of claim 1, further comprising said first magnetoresistive layer being stabilized utilizing magnetic domain pinning along edges of said grating pattern.

3. The read head of claim 1, further comprising said grating pattern being patterned at an acute angle with respect to a direction of a bias current applied to said read head.

4. The read head of claim 1, further comprising said grating pattern being formed on said surface of said first insulator layer utilizing photolithographic masking and etch process to the first insulator layer.

5. The read head according to claim 1, further comprising:
    said first and second magnetoresistive layers and said second and third insulator layers conforming to a shape of said surface of said first insulator layer as said first and second magnetoresistive layers and said second and third insulator layers are deposited such that said grating pattern is replicated through said first and second magnetoresistive layers and said second and third insulator layers.

6. The read head of claim 1, further comprising said first and second magnetoresistive layers being deposited so that an easy axis of said first magnetoresistive layer is parallel to an easy axis of said second magnetoresistive layer.

7. The read head of claim 6, wherein the easy axis of said first magnetoresistive layer is parallel and opposing to the easy axis of said second magnetoresistive layer.

8. A dual element magnetoresistive read head for reading information from a magnetic tape, said read head comprising:
    a first insulator layer;
    a first magnetoresistive layer formed on said first insulator layer;
    a second insulator layer formed on said first magnetoresistive layer;
    a second magnetoresistive layer formed on said second insulator layer, said second magnetoresistive layer magnetostatically coupled to said first magnetoresistive layer;
    a third insulator layer formed on said second magnetoresistive layer; and
    said first insulator layer including a linear grating pattern unidirectionally formed on a surface of said first insulator layer;
    wherein said first and second magnetoresistive layers are deposited so that a first easy axis of said first magnetoresistive layer is parallel to a second easy axis of said second magnetoresistive layer, wherein said first and second magnetoresistive layers have an easy axis orientation set and strengthened by an external field;
    a magnetic orientation of said first magnetoresistive layer rotating from a direction of said first easy axis to a rotated direction that is parallel to said grating pattern, and a magnetic orientation of said second magnetoresistive layer rotating from a direction of said second easy axis to a rotated direction that is parallel to said grating pattern in response to an application of a bias current to said read head; and
    said rotated direction of said magnetic orientation of said first magnetoresistive layer opposing said rotated direction of said magnetic orientation of said second magnetoresistive layer.

* * * * *